METHOD AND APPARATUS FOR DETECTING LIGHT BY CAPACITANCE CHANGE USING SEMICONDUCTOR MATERIAL WITH DEPLETION LAYER

Filed Dec. 19, 1966 2 Sheets-Sheet 1

Inventors:
STUART S. PERLMAN &
BERNARD GOLDSTEIN

By W. S. Hill
Agent

Inventors:
STUART S. PERLMAN &
BERNARD GOLDSTEIN
By W. S. Hill
Agent

United States Patent Office 3,502,884
Patented Mar. 24, 1970

3,502,884

METHOD AND APPARATUS FOR DETECTING LIGHT BY CAPACITANCE CHANGE USING SEMICONDUCTOR MATERIAL WITH DEPLETION LAYER

Stuart S. Perlman and Bernard Goldstein, Princeton, N.J., assignors to RCA Corporation, a corporation of Delaware Filed Dec. 19, 1966, Ser. No. 603,036
Int. Cl. H01j 39/12
U.S. Cl. 250—211 5 Claims

ABSTRACT OF THE DISCLOSURE

Method and apparatus for detecting variations in light intensity by a capacitance change in which the device comprises a semiconductor body composed of a high-resistivity, compensated material with deep-lying traps. Electrodes, one of which is a barrier layer electrode, on opposite faces of the body are connected to a capacitance meter. Visible light having energy approximately equal to or greater than the bandgap of the material, when directed upon the barrier layer electrode, causes an increase in capacitance due to narrowing of the space charge region. Infra-red light can also be detected by quenching photocapacitances when the cell is first biased with bandgap radiation.

This invention relates to an improved semiconductor method and device in which capacitance changes are used to detect changes in light intensity. More particularly, it relates to a method and device in which capacitance varies inversely as the width of a depletion layer in a semiconductor body and the depletion layer width varies in response to intensity of light directed on the layer. The device may be used as a highly sensitive detector of light of energy which is approximately equal to or greater than the semiconductor energy gap. In one modification of the device and method, light of energy substantially less than the semiconductor energy gap may be detected.

Various light-sensitive devices are known in which the electrical conductivity of a semiconductor varies with light intensity. Such devices include the well known selenium photocell, the cadmium sulfide, selenide or telluride type cell and the copper oxide type. In another well known type of photocell, light impinging on a P-N junction in a semiconductor body, causes the generation of an electrical current.

Another previously-known type of photocell is one in which electrons are emitted into a vacuum in response to impingement of light on a semiconductor element.

Although these previously-known devices have light sensing properties which are adequate for many uses, their sensitivity to changes in light intensity is actually relatively low and it would be desirable, for some uses, to have detecting units of greatly increased sensitivity. The reason why sensitivity is relatively low is that light intensity is being measured in terms of current flow and it requires a relatively large change in light intensity to obtain a significant change in current output of any of these devices.

Still other light-sensitive devices are known in which the capacitance of a structure varies in response to variation in the dielectric constant of a photosensitive dielectric medium. But this type of light detecting device is not as satisfactory as desired since the capacitance is not changed to a high enough degree by a given change in dielectric constant.

One object of the present invention is to provide an improved light detecting device utilizing changes in photocapacitance.

Another object of the invention is to provide an improved light-detecting device capable of detecting both high energy light and infra-red light at room temperature.

Briefly, the improved apparatus and method of one embodiment of the present invention involves providing a body of semiconductor material having a bandgap which is not substantially larger than the energy of the light to be detected, the body being of high resistivity, compensated material with a relatively high proportion of deep-lying traps, and the body also including a depletion region the space-charge of which is dominated by the net charge of the traps. Light being detected is directed onto a surface of the body so that it penetrates to the depletion layer and changes the thickness of this layer. A given change in thickness of the depletion layer causes a relatively large change in the capacitance of the device. The capacitance change may be measured by converting it to a change in frequency of an oscillator.

In another embodiment of the invention, light having energy substantially lower than the bandgap energy of the semiconductor detector body is detected by first biasing the detecting body of the apparatus with bandgap light which produces an increase in photocapacitance. The low energy light is then detected as a quenching or decrease of the photocapacitance.

Figure 1:
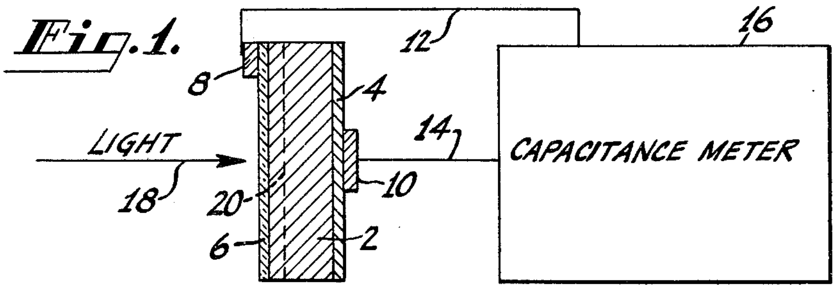
FIG. 1 is a schematic drawing, partially in section, of apparatus of the present invention.

Referring to FIG. 1, an embodiment of apparatus in accordance with the present invention may comprise a body 2 of a suitable semiconducting material such as single crystalline gallium phosphide having one major face provided with a transparent barrier layer film 6 and an opposite major face provided with an ohmic contact layer 4. An ohmic metal contact 8 is provided at one edge of the barrier layer film 6 and another ohmic contact electrode 10 is joined to the ohmic contact layer 4. Leads 12 and 14 connect electrodes 8 and 10, respectively to a capacitance meter 16.

Light to be detected by the device is directed, as shown by the arrow 18, to impinge on the film 6. The light penetrates into the body 2 and causes a variation in the thickness of a depletion region indicated by the dotted line 20 beneath the barrier layer film 6. Changes in the thickness of the depletion region cause changes in the capacitance of the device and the capacitance changes are read on the meter 16.

An example of manufacture of the semiconductor device part of the apparatus will now be given.

First, a layer of single crystal gallium phosphide is grown epitaxially on a substrate of single crystal gallium arsenide, as, for example, by hydrogen reduction of a mixture of gallium trichloride and phosphorus trichloride. The single crystal layer or body of gallium phosphide may also be made by other known methods such as growth from a melt of gallium phosphide.

Grown layers of gallium phosphide generally turn out to be N type with carrier concentrations of about $5 \times 10^{15}$ to $5 \times 10^{17}/cm.^3$. These layers also usually have majority carrier mobilities of 50 to 200 $cm.^2/v.$-sec.

After removing the gallium arsenide substrate, by selectively etching with a mixture of hydrofluoric and nitric acids, the gallium phosphide layer is compensated by diffusing in copper to get a substantially uniform distribution of copper atoms throughout. The required diffusion temperatures depend on the majority carrier concentration of the starting material. Approximate temperatures are given in the table.

TABLE

| Majority carrier conc. in atoms/$cm.^3$: | Temperature, Degrees C. |
|---|---|
| $10^{15}$ | 600 |
| $10^{16}$ | 675 |
| $10^{17}$ | 750 |
| $10^{18}$ | 875 |

The diffusion time decreases as the temperature increases. About 100 hours of diffusion time are required at the lowest temperature. At highest diffusion temperatures only about one hour is required. The copper may also be introduced during the growth of the crystal to produce the uniform distribution.

Figure 2:
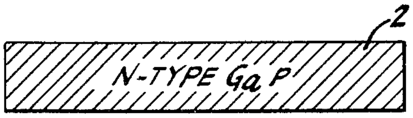
FIG. 2 is a section view of a semiconductor detector body in an early stage of making a device usable in the apparatus of the invention.

At this stage, the resulting body 2 is as shown in FIGURE 2. It may have a thickness of, for example, 10–20 mils and, in any event, not less than about 1 mil.

An ohmic contact is applied to one major face of the body 2 by depositing a layer 4 (FIGURE 3) of silver which contains 1% by weight tellurium, by evaporation, and sintering for 1 minute at a temperature of about 700° C.

A barrier layer 6 is applied to the opposite major face by vapor depositing a transparent film of gold about 200 A. thick. Before depositing the gold, the face of the crystal is etched with aqua regia.

Figure 3:
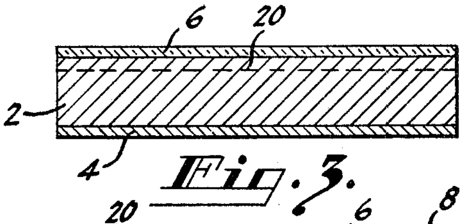
FIG. 3 is a section view of the semiconductor body of FIG. 2 showing a later stage in the method of making the device.
Figure 4:
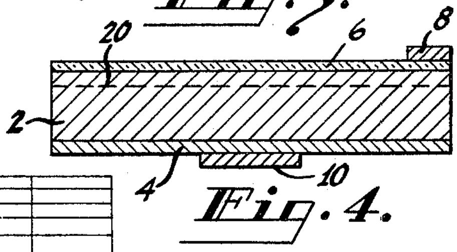
FIG. 4 is a section view like that of FIGS. 2 and 3 showing the semiconductor body at a still later stage of completion of the device.

The depletion region associated with the barrier layer 6 is indicated in FIGURES 3 and 4 by dotted line 20.

A contact electrode 8 (FIGURE 4) is applied to one edge of the barrier layer film 6 by depositing a thick shoulder of gold thereon.

A solder contact electrode 10 is applied to the surface of ohmic contact layer 4. Lead wires 12 and 14 are then attached to contact electrodes 8 and 10, respectively. The leads 12 and 14 are connected to a capacitance meter and the apparatus is ready to detect the presence or absence of light or to detect relatively small changes in light intensity.

In the dark, the semiconductor unit exhibits very low capacitance. A unit having a junction area of 0.001 $cm.^2$, for example, had a capacitance of less than 10 picofarads. When exposed to bandgap radiation of moderate intensity, the capacitance jumped to greater than 1000 picofarads.

Figure 5:
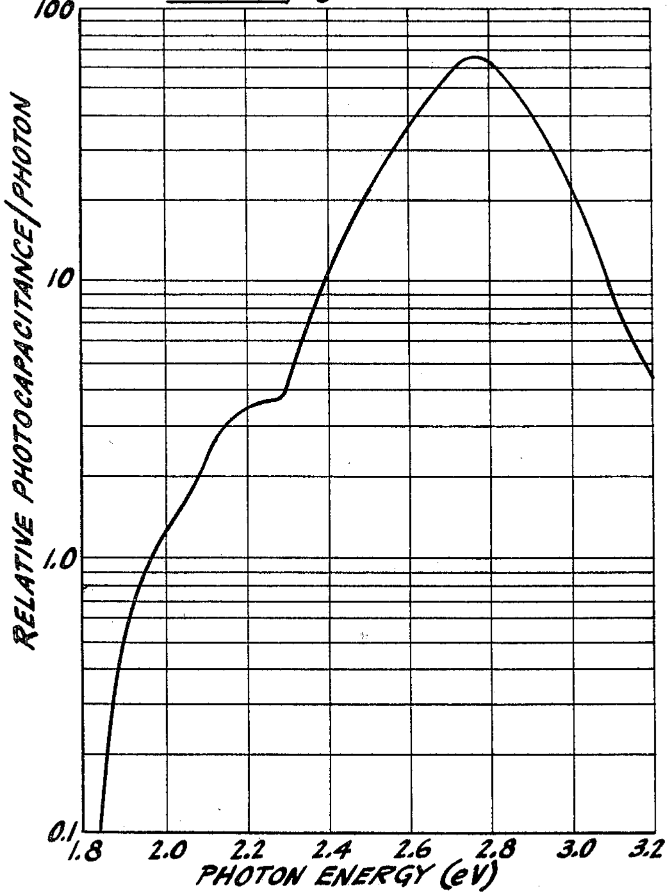
FIG. 5 is a graph showing the relative photocapacitance response of the apparatus of the present invention to light of different energies approximately equal to and higher than the bandgap of the semiconductor detector body.

The sensitivity of the photocapacitance of the semiconductor unit varies with the light energy that impinges on the barrier layer. The sensitivity begins near the semiconductor bandgap energy and extends throughout the visible region as shown in the graph of FIGURE 5, for a semiconductor unit made as described above. Although the unit is sensitive primarily to light of energy greater than the bandgap energy of the semiconductor, it also has some sensitivity in a region which extends below the bandgap energy.

The large photocapacitance observed in these surface barrier structures is due to light-induced changes in the width of the space charge region (depletion layer). Copper compensates the material to high resistivity N type by the addition of acceptor levels. These levels are ionized, that is, they contain no holes, in the dark, and thus have a net negative charge. Under this condition, the space charge region, which is positive for an N type junction, is relatively wide and the junction capacitance is very low. With the application of bandgap radiation, valence band holes are produced and subsequently trapped at the acceptor levels. Once the acceptor levels are filled with holes they no longer have a compensating effect and the width of the depletion layer is reduced. This produces a sharp increase in the barrier capacitance.

Figure 6:
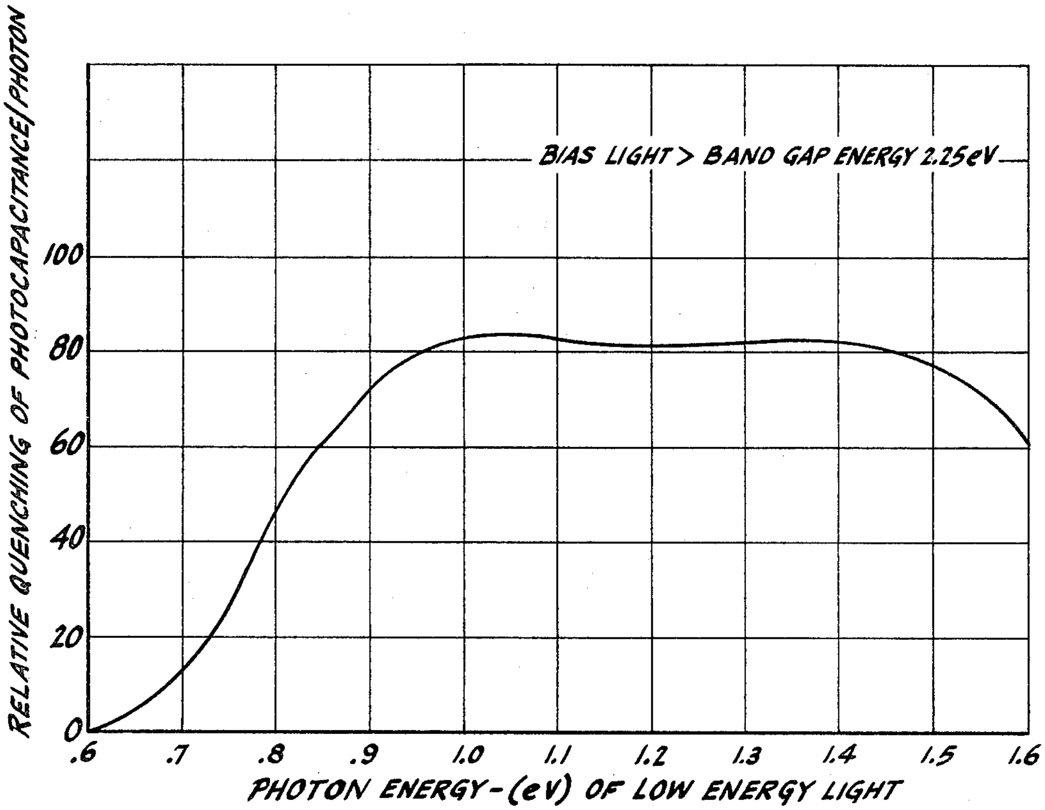
FIG. 6 is a graph showing the relative quenching effect on photocapacitance of low energy light, using apparatus of the present invention.

In another embodiment of the method of the present invention, light having energy substantially less than the semiconductor energy gap can be detected with a relatively high degree of sensitivity. In this embodiment, biasing light of energy greater than the bandgap energy (2.25 ev.) of gallium phosphide, is first directed onto the transparent film 6, producing the sharp increase in capacitance described above. The capacitance of the device is noted on the capacitance meter. With the biasing light remaining on, light of substantially lower than bandgap energy but sufficient to empty the traps which were filled by the biasing light source, is then directed on the film 6. The capacitance will be observed to drop sharply in proportion to the intensity of the low energy light. Variation of the photoquenching effect of low energy light with the photon energy of the light is shown in the curve of FIGURE 6.

Although the device of the invention has been illustrated using gallium phosphide as the semiconductor material, other semiconductors may be used. For example, the elemental semiconductors germanium and silicon may be used. Other III–V compound semiconductors, i.e., gallium arsenide may also be used, and also II–VI compound semiconductors such as cadmium sulfide, zinc sulfide and zinc selenide. Technologies of forming barrier layers in these materials and of forming compensated, high resistivity materials are well known.

What is claimed is:

1. A method of detecting light radiation comprising providing a body of semiconductor material having metallic electrodes on opposite major surfaces thereof, said body being of high resistivity, compensated material with a relatively high proportion of deep-lying charge traps, said body also including a depletion layer the space-charge of which is dominated by the net charge of said traps, directing said radiation into said body to said depletion layer thereby changing the capacitance of said body, and measuring said change in capacitance.

2. A method according to claim 1 in which said semiconductor has a bandgap not larger than the energy of the light to be detected and said capacitance change is an increase.

3. A method according to claim 1 in which low energy light is detected by first biasing said body by directing high energy light thereon, and, while said body is thus biased, directing said low energy light on said body, whereby an initial increase in capacitance caused by said high energy light is quenched by said low energy light.

4. A variable capacitance device comprising a body of particular bandgap semiconductor material with electrodes on opposite major surfaces thereof, one of said electrodes being light-transparent, said material being of relatively high resistivity and being compensated to a high degree, said body also having a relatively high proportion of deep-lying charge-carrier traps and having a depletion layer the space-charge of which is dominated by the net charge of said traps, and means connected across said electrodes for measuring the capacitance of said body.

5. A device according to claim 4 in which said semiconductor material is gallium phosphide.

References Cited

UNITED STATES PATENTS

| | | | |
|---|---|---|---|
| 2,985,757 | 5/1961 | Jacobs et al. | 250—211 |
| 3,040,262 | 6/1962 | Pearson | 330—7 |
| 3,049,622 | 8/1962 | Ahlstrom et al. | 250—211 |
| 3,132,258 | 5/1964 | Gaertues et al. | 250—211 |

RALPH G. NILSON, Primary Examiner

M. ABRAMSON, Assistant Examiner